United States Patent [19]
Hoff

[11] Patent Number: 5,932,686
[45] Date of Patent: Aug. 3, 1999

[54] ADHESION PROMOTER FOR A POLYAMID-COMPOUNDS

[75] Inventor: Heinz Hoff, Tamins, Switzerland

[73] Assignee: EMS-Inventa AG, Switzerland

[21] Appl. No.: 08/954,344

[22] Filed: Oct. 17, 1997

[30]      Foreign Application Priority Data

Oct. 18, 1996 [DE] Germany .................. 19643143

[51] Int. Cl.$^6$ .................. C08G 69/44; B32B 27/08; B32B 27/34; B32B 1/08
[52] U.S. Cl. .................. 528/288; 528/318; 525/420.5; 525/425; 428/36.91; 428/474.4; 428/474.7; 428/475.2
[58] Field of Search .................. 528/288, 318; 525/420.5, 425; 428/474.4

[56]      References Cited

U.S. PATENT DOCUMENTS

| | | | |
|---|---|---|---|
| 3,849,514 | 11/1974 | Gray, Jr. et al. | 528/295 |
| 4,129,715 | 12/1978 | Chen et al. | 528/67 |
| 4,871,804 | 10/1989 | Murabayashi | 525/392 |

*Primary Examiner*—Tae Yoon
*Attorney, Agent, or Firm*—Dick and Harris

[57]      ABSTRACT

This invention relates to adhesion agents and compatibility agents, respectively, on the basis of partially crystalline, high-molecular block (co)polyester amides, produced by direct esterification of carboxyl-terminated or hydroxycarboxyl-terminated polyamide precondensates and hydroxyl-terminated or hydroxycarboxyl-terminated polyester segments, characterized in that the block (co)polyester amides form two crystalline phases and comprise as segments (A) at least one polyamide or copolyamide block having a uniform number average molar mass of at least 1000 g/mole, (B) at least one aromatic polyester and/or copolyester block having a uniform number average molar mass of at least 1000 g/mole, and (C) at least one further diol component of the general structure

HO—R—OH, wherein R is selected from the group consisting of aliphatic or partially aromatic (co)polyesters, aliphatic polyethers, aliphatic (co)polyester amides, polycarbonates or aliphatic or aromatic hydrocarbons.

Furthermore, this invention concerns a process for the production of the above-mentioned block (co)polyester amide molding compounds as well as various possible uses.

24 Claims, No Drawings

ADHESION PROMOTER FOR A POLYAMID-COMPOUNDS

BACKGROUND OF THE INVENTION

1. Field of the Invention

This invention relates to novel adhesion agents for polyamide composite structures, particularly for polyamide 12-polybutylene terephthalate composite structures.

2. Description of the Prior Art

The subject matter of the invention relates particularly to new adhesion agents and agents that improve the compatibility [hereinafter referred to as compatibility agents] on the basis of high-molecular block (co)polyester amides, produced by direct esterification of carboxyl-terminated or hydroxycarboxyl-terminated polyamide precondensates, hydroxyl-terminated or hydroxycarboxyl-terminated polyester precondensates and a further diol component. The block (co)polyester amides have two separate crystalline phases which are formed by the (co)polyamide and (co) polyester (PES) segments. In addition, the invention relates to a process for the production of these block (co)polyester amides and the use of the block (co)polyester amides for the production of fibers, sheets or films, molded articles and particularly as adhesion agents of corresponding polyamide polyester multilayer or composite structures and as compatibility agents of corresponding polymer blends.

EP-A-0287839 describes inter alia composite structures consisting of polyamide mixtures and polyester resins. Thermoplastics are used as adhesion agents, whose chemical composition differs from the adjacent layers of the composite structure. Functionalized polyolefins, functionalized ethylene-vinyl acetate copolymers, ethylene-acrylate copolymers, ionomers, polyalkylene oxide-polyester block polymers, derivatives of carboxymethyl cellulose as well as blends of these polymers with polyolefins are mentioned as suitable adhesion agents. However, the interlaminar or composite strengths achievable with these adhesion agents in the polyamide/polyester system are little and fully lost during heating or in contact with solvents, since the adhesion agents are not sufficiently thermoforming stable and solvent-resistant.

EP 0509211 B1 and EP 0509212 B1 describe thermoplastic composite structures on the basis of polyamides and polyesters. The described adhesion agents are polyamide-polyester blends which were obtained by reactive extrusion. Reactive extrusion using polyamide and polyester is described inter alia in EP-A-0084643 and in "Polymer Engineering and Science, 24, 1300 (1984). It is disadvantageous that only a minor portion of the blending reactants is converted into copolymers, however with totally undefined structure. The blends usually have poor mechanical properties; particularly their high degree of brittleness is marked. As compared to the corresponding initial components, the composite strength of these blends is usually only sufficient for one blending reactant.

EP 042008 B1 discloses polyester amides containing benzenedicarboxylic acids and 1,4-butanediol in the polyester portion and ω-aminoundecanoic acid and ω-aminododecanoic acid, respectively, in the polyamide portion. Since the polyamide components are used as monomers, a random incorporation of the components results, on the one hand, and a partial degradation of the polyester precondensate results, on the other hand. Because of their structure, such materials are unsuitable to act as adhesion agents.

The block polyester amides described in DE-A-3435053 are made from block polyamide dicarboxylic acids having a mean molar mass of 1000–8000 g/mole and block polyester diols. However, the described mode of operation effects a strong degradation of the polyamide and polyester blocks used. Here, too, the polyamide and polyester portions only have minor polymerization degrees. A phase-mediating effect for correspondingly composed homopolymers does not occur, since none of the adjacent polymer layers is wetted in optimum fashion by the mean surface tension of the random polyester amides, on the one hand, and major chain sections cannot interact without disturbances, on the other hand. The low melting point of random polyester amides rapidly leads to a loss of composite strength in the case of heating. In addition, random polyester amides have tear resistance little as compared to polyamides and polyesters.

DE-A-2129476 describes hot-melt adhesion agents on the basis of a block polyester amide having high thermostability. The block polyester amide consists of a partially crystalline polyester portion and an amorphous polyamide portion. The polyester segments are produced in situ by glycosylation and transamidation, based on high-molecular polyesters. The operating mode as well as the melting points low as compared to the homopolyester suggest short block lengths and/or intense amide-ester exchange reactions. The polyester amides used as hot-melt adhesion agents have a relatively low molar mass. Similar products are described in U.S. Pat. No. 4,548,996 and GB-A-1340214.

U.S. Pat. No. 3,849,514 describes block polyester amides having improved segment stability. Before further reacted with polyester diols, the precondensates synthesized from diamines and dicarboxylic acids have to be provided with ester or hydroxyl ester terminal groups. A variant consists in the synthesis of the ester-masked polyamide precondensates by aminolysis of the diesters of dicarboxylic acids, the phenolate being used preferably. When the reaction proceeds, phenol has to be distilled off. The polyamide portion is restricted to polyamides of the AABB type. Lactams and ω-aminocarboxylic acids are not listed as monomers.

Most of the polymers are incompatible with one another. Therefore, suitable adhesion agents and compatibility agents, respectively, have to be used for the production of efficient composite structures and polymer mixtures. Optimum interaction between polymer and a suitable adhesion agent can only be assumed if identical structural units of sufficient size can interact with one another. Therefore, the above-mentioned prior art adhesion agents which have a structure and chemical composition differing from polyamide and polyester are suited for polyamide-polyester composite structures only to a point.

Most of the above-described polyester amides are lacking the defined structure, particularly the polyamide and polyester segments have excessively small polymerization degrees because of the employed monomers or the production process, so that the interaction with respect to polyamide and polyester remains on a low level. The achieved molar masses and thus the melt viscosities are also often too low for these materials to be processed by extrusion and to include sufficient mechanical properties. An adhesion agent effect for corresponding polyamide-polyester composite structures is not described. Because of the rather random structure of these products this cannot be expected either. Moderate mechanical properties and the low melting temperature of these products further restrict the possible uses. In addition, the random polyester amides dissolve in many current solvents, so that the composite structure is also dissolved upon the influence thereof.

SUMMARY OF THE INVENTION

Therefore, it is the object of this invention to provide special adhesion agents for polyamide-polyester multilayer composite structures and compatibility agents for polymer blends, which can be processed by extrusion or coextrusion and whose mechanical properties can be coordinated with the respective application.

This object is achieved by the adhesion agent molding compounds or materials and compatibility agent molding compounds or materials, respectively, according to the invention on the basis of block (co)polyester amides according to claim 1, which perfectly combine the properties of polyester and polyamide, e.g. particularly the advantageous mechanical and thermal properties. Essential for fulfilling the adhesion agent function and/or the compatible-rendering properties of the block polyester amides is the presence of two crystalline phases, i.e. polyamide and polyester segments crystallize in separate phases, as well as a minimum size of the respective segments.

Furthermore, a process for the production of these block polyester amide molding compounds as well as possible uses of these adhesion agent molding compounds and compatibility agent molding compounds, respectively, shall be described. This is solved by the process according to claim 11 as well as the uses according to claims 12 to 15.

Thus, the invention relates to adhesion agent molding compounds and compatibility agent molding compounds, respectively, on the basis of high-molecular block (co) polyester amides, which are produced by direct esterification of carboxyl-terminated or hydroxycarboxyl-terminated polyamide precondensates and hydroxyl-terminated or hydroxycarboxyl-terminated polyester segments. The block (co)polyester amides are characterized by two crystalline phases and consist of a polyamide or copolyamide block having a uniform number average molar mass of at least 1000 g/mole, an aromatic polyester or copolyester block having a uniform number average molar mass of at least 1000 g/mole and at least one further diol component of the general structure HO—R—OH, R being selected from group (1) consisting of aliphatic polyesters, or (2) consisting of aliphatic or partially aromatic polyethers, or (3) consisting of aliphatic polyester amides, or (4) consisting of aliphatic or aromatic hydrocarbons. The diol component must be largely incompatible with both the polyamide segments and the polyester segments.

The wetting behavior of the polymers is essential for developing the polymer boundary surfaces in the system polyamide/polyester/adhesion agent, particularly the formation of the polymer boundary surface between adhesion agent and polyester being critical. Because of the special structure, the adhesion agents according to the invention have surface tensions similar to those of the employed polyester types, so that good wetting results which is a precondition for good adhesion. Random or alternating copolyester amides always have mean surface tensions, so that neither polyamide nor polyester is wetted in optimum fashion. In addition, the formation of the composite, i.e. the integral bond, is aggravated by the low interaction of short chain sections and the impeded interdiffusion.

In contrast thereto, polyester (polyamide) segments having structural units of the adjacent polyester (polyamide) can interact for the first time in the block (co)polyester amides according to the invention because of the defined structure and interdiffuse depending on the contact time of the melts, so that a strong, integral bond is formed when the polymer boundary surface grows.

The weight portion of the ester structures of the block (co)polyester amides according to the invention is between 30 and 70%, the portion of the amide structures is between 70 and 30 %.

Moreover, this invention relates to a process for the production of the block polyester amide molding compounds according to the invention. The polyamide-forming components are prepolymerized as usual to give a precisely determined number average molar mass and, after conclusion of the degassing phase, stirred at reduced pressure until the water content of the precondensate falls below 0.005% by weight. Then, the solid or molten polyester precondensate is added and the second diol component and the esterification catalyst are added partially and fully, respectively. Directly after the addition, the vacuum phase is started. If together with the addition of the polyester precondensate only part of the diol was added, the rest of the second diol system would be added at reduced pressure at the beginning of the synthesis phase, i.e. the built up, of the block polyester amide. Another variant consists in adding the entire or a partial amount of the diol component before the 1st vacuum phase starts.

The processing parameters pressure, temperature and the catalyst type are chosen such that during the polycondensation of the block polyester amide the molar masses and the composition of the employed polymer blocks are not changed. Therefore, in the first step of the process according to the invention (polyamide prepolymers), temperatures of 180 to 300° C. and a pressure ranging from atmospheric pressure to 30 bar are applied. The first processing step is terminated by applying a vacuum (pressure: <10 mbar). The polyamide precondensates according to the invention have an $NH_2$ terminal group concentration below 5 mmoles/kg and a maximum water content of 0.005% by weight. In a second processing step, polyester precondensates are obtained by direct esterification of corresponding dicarboxylic acids and diols or by reesterification of the dicarboxylic acid dimethyl esters with diols. Only those polyester precondensates which have a maximum COOH terminal group concentration of 50 mmoles/kg are inventive. In the third processing step, polyamide and polyester prepolymers are condensed by adding a diol system at temperatures ranging from 220 to 300° C. to give the block polyester amides according to the invention. The pressure is reduced stepwise and linearly, respectively, to a final pressure of 1 to 10 mbar. The esterification catalyst can be used in the process according to the invention in amounts from 0.05 to 0.2% by weight, based on the total charge. In addition, stabilizers can be used during the polycondensation.

The required polyamide segments are based on PA 6, PA 6 6, PA 6 9, PA 6 10, PA 6 12, PA 6 36, PA 11, PA 12, PA 12 12 as well as copolyamides and multipolyamides, based on the dicarboxylic acids C2–C36 and diamines C2–C12 as well as lactam-6, lactam-12, isophthalic acid, terepthalic acid and naphthalene dicarboxylic acid. Lactam-containing polyamides are preferred. The PA blocks may also be obtained by polycondensation of the corresponding salts of diamine and dicarboxylic acid. The polyamide precondensates shall have a carboxyl terminal group concentration of at most 2000 mmoles/kg, a hydroxyl terminal group concentration of at most 1000 mmoles/kg, and an amino terminal group concentration of at most 5 mmoles/kg.

Predominantly aromatic dicarboxylic acids or the diesters thereof are used for the synthesis of the polyester precondensates. Terephthalic acid, isophthalic acid, naphthalene dicarboxylic acids, 4,4'-oxybis(benzoic acid), 5-t-butyl-1,3-benzenedicarboxylic acid and the dimethyl esters thereof, respectively, are preferred. The diols in consideration are all aliphatic or cycloaliphatic $C_2$–$C_{12}$ diols. Ethylene glycol, butanediol and hexanediol are used preferably. The polyester precondensates shall have a hydroxyl terminal group concentration of at most 2000 mmoles/kg and a carboxyl terminal group concentration of at most 50 mmoles/kg.

In principle, every bifunctional alcohol having primary and secondary OH groups can be used as diol component. Primary diols having a number average molar mass of over 500 g/mole are used preferably. Special formulations require the use of a binary diol mixture consisting of a low-molecular and a polymolecular diol (>500 g/mole). Relatively long-chain diols in consideration are OH-terminated polyesters, polyethers, random polyester amides or hydrocarbons. OH-terminated polycaprolactones, polyalkylene adipates, polyalkylene dimerate, polydimerdiol dimerates, polycarbonates, polyalkylene glycols on the basis of $C_2$–$C_4$ and dimer diol are used preferably. The low-molecular diol component is selected from the group consisting of the aliphatic or cycloaliphatic $C_2$–$C_{12}$ diols or the aromatic $C_6$–$C_{18}$ diols.

The esters and polyamides used according to the invention may also be admixed with the conventional reinforcing agents and fillers, respectively, such as mineral fillers, UV stabilizers, antioxidants, pigments, dyes, nucleating agents, crystallization accelerators and retarders, respectively, flowing agents, lubricants, mold-release agents, flame retardants as well as agents improving the electrical conductivity and modified or non-modified rubbers.

The three components (A), (B) and (C) have to be combined thereby obtaining the defined prepolymerized polyamide and polyester segments, so that a block polyester amide having a defined structure results. Only under this precondition can the block polyester amides according to the invention fulfil their adhesion-agent function. This defined structure can only occur when a hydrolytic degradation of the polyamide and polyester precondensates and amide-ester exchange reactions are avoided and the respective precondensates have the terminal group functionality and concentration according to the invention. Thus, it is indispensable that processing step 1, namely the production of the polyamide precondensates, is followed by a vacuum phase and the polyester precondensate is added as solid or as melt at reduced pressure. The 2nd processing step requires the reduction of the carboxyl terminal group concentration to a maximum of 50 mmoles/kg and of the water content to below 0.005% by weight. The average molar mass of the two precondensates has to be adjusted such that the formation of two crystalline phases is possible in the end product, i.e. the block polyester amide, and the requested terminal group concentrations are not exceeded. In the 3rd step, the two precondensates are polycondensed by adding the diol component, the esterification catalyst and optionally a stabilizer system to give a high-molecular polyester amide. For this purpose, temperatures ranging from 220 to 300° C. and a vacuum of <10 mbar are necessary.

Furthermore, this invention relates to the use of the adhesion agent molding compounds and compatibility agent molding compounds, respectively, on the basis of the partially crystalline, high-molecular block (co)polyester amides for the production of fibers, sheets or films and molded articles or as compatibility agents in coextrudates on the basis of polyamide and polyester.

Moreover, this invention concerns thermoplastic composite structures consisting of at least one layer of a molding compound on the basis of (co)polyamide, at least one layer of a molding compound on the basis of (co)polyester and at least one intermediate layer on the basis of the adhesion agent molding compound comprising the described high-molecular block (co)polyester amides according to the invention. The composite structures according to the invention can be manufactured in one step or several steps. In the one-step extrusion process, the various melts are coextruded as usual. In the case of the multi-step processes, a molding consisting of one component is initially made and then bonded to the other components by pressing, injection molding or extruding.

The composite structures according to the invention show excellently a good resistance to as well as good blocking efficiency over chemical reagents, solvents and fuels. In addition, the layers are frictionally bonded to one another. This bond is present directly after the extrusion and is also maintained after the immersion of the composite structures into fuels.

The composite structures according to the invention are used for structural members, above all for the automobile, electrical, machine-building industries. In particular, they are used as sheets or films or as laminated tubes or pipes in the automobile field.

Therefore, this invention also relates to composite polymer hose pipes or tubes which may optionally also be corrugated at least in a section and consist of inner and outer layers on the basis of polyamide and polyester, the inner and outer layers being bonded by at least one intermediate layer on the basis of an adhesion agent molding compound based on the high-molecular block copolyester amides according to the invention. The inner layer of the polymer tube or hose pipe according to the invention is inert with respect to the medium to be transported; the outer layer is resistant to pressure and mechanical influences.

The layer thickness of the hose pipe or tube according to the invention is not critical.

outer layer thicknesses ranging from 0.2 to 0.8 mm, adhesive layer thicknesses ranging from 0.05 to 0.3 mm, and inner layer thicknesses ranging from 0.01 to 0.7 mm are preferred.

As stated above, it is also possible to provide the wall of the hose pipe or tube with an annular or spiral corrugation, to modify the protective layers in an antistatic or impact-resistant fashion or by means of plasticizers or other additives according to the prior art and make them stable as regards length by the addition of glass fibers, respectively.

A section of the composite polymer pipes or tubes according to the invention may be corrugated, and the rings formed by the corrugations extend about the tube axis, it being possible that the corrugations have at least partially oval shape or the shape of an ellipse and the shape of a circle flattened on one side, respectively. Such geometries, i.e. development of the corrugations of tubes, are described in DE-A-4432584, for example.

The polymer pipe or tube according to the invention can be produced by coextrusion of a polymer tube and optionally subsequent development of the corrugations including optionally present flattenings by blow or suction molding.

However, the polymer pipe or tube according to the invention can also be produced by extrusion-blow molding, coextrusion-blow molding, sequential blow molding with or without hose manipulations.

The invention shall now be explained in more detail by the following examples.

Examples 1–12

Example 1

Polybutylene terephthalate (PBT) having $M_n$=2200 g/mole (COOH concentration $\leq$50 mmoles/kg)

50.0 kg of terephthalic acid, 39.3 kg of butanediol, and 60 g of butyl stannic acid are condensed at temperatures of 180 to 230° C. After conclusion of the esterification, the condensate is discharged to a cooling conveyor and comminuted by means of crushers. The PBT precondensate has a solution viscosity of 1.07 (0.5% in m-cresol) and a melting point of 207° C.

Example 2

Polybutylene terephthalate having $M_n$=2800 g/mole (COOH concentration $\leq$50 mmoles/kg)

50.0 kg of terephthalic acid, 57.0 kg of butanediol and 60 g of butyl stannic acid are condensed at temperatures of 180 to 220° C. at normal pressure. After 3.5 h, full vacuum is applied for 40 min. and then the melt is discharged to a cooling conveyor and broken. The PBT precondensate has a solution viscosity of 1.09 (0.5% in m-cresol) and a melting point of 212° C.

Example 3

25.0 kg of 12-aminolauric acid and 1.71 kg of dodecanedicarboxylic acid are condensed at temperatures up to 260° C. to give a PA 12 precondensate. Then, a vacuum (<10 mbar) is applied for 1 hour. After discontinuing the vacuum using nitrogen, 16.8 kg of the polybutylene terephthalate precondensate from Example 1 as well as 60 g of butyl stannic acid are introduced into the polyamide melt with agitation. A vacuum is applied again directly afterwards. The oil temperature remains at 260° C. After 40 min., calculated from the beginning of the 2nd vacuum phase, 1.0 kg of dimer diol are added via a lock. After another 50 min., the desired torsional moment is achieved and the block polymer is discharged.

Example 4

20.0 kg of 12-aminolauric acid and 2.04 kg of dodecanedicarboxylic acid are condensed at temperatures up to 260° C. to give a PA 12 precondensate. Then, a vacuum (<10 mbar) is applied for 1 hour. After discontinuing the vacuum using nitrogen, 20.0 kg of the polybutylene terephthalate precondensate from Example 1 as well as 60 g of butyl stannic acid are introduced into the polyamide melt with agitation. A vacuum is applied again directly afterwards. The oil temperature remains at 260° C. After 40 min., calculated from the beginning of the 2nd vacuum phase, 1.0 kg of Pripol 2033® are added via a lock. After another 50 min., the desired torsional moment is achieved and the block polymer is discharged.

Example 5

17.0 kg of 12-aminolauric acid and 2.83 kg of dodecanedicarboxylic acid are condensed at temperatures up to 260° C. to give a PA 12 precondensate. Then, a vacuum (<10 mbar) is applied for 1 hour. After discontinuing the vacuum using nitrogen, 27.6 kg of the polybutylene terephthalate precondensate from Example 1 as well as 60 g of butyl stannic acid are introduced into the polyamide melt with agitation. A vacuum is applied again directly afterwards. The oil temperature remains at 260° C. After 40 min., calculated from the beginning of the 2nd vacuum phase, 1.0 kg of dimer diol are added via a lock. After another 50 min., the desired torsional moment is achieved and the block polymer is discharged.

Example 6

20.0 kg of 12-aminolauric acid and 2.32 kg of dodecanedicarboxylic acid are condensed at temperatures up to 260° C. to give a PA 12 precondensate. Then, a vacuum (<10 mbar) is applied for 1 hour. After discontinuing the vacuum using nitrogen, 28.2 kg of the polybutylene terephthalate precondensate from Example 1, 0.8 kg of dimer diol as well as 52 g of butyl stannic acid are introduced into the polyamide melt with agitation. A vacuum (<2 mbar) is applied again directly afterwards. The oil temperature remains at 260° C. After 100 min., the desired torsional moment is achieved and the block polymer is discharged.

Example 7

8.0 kg of laurinlactam are polymerized by adding 0.388 kg of dodecanedicarboxylic acid (pressure phase: 300° C. and 20 bar, stress relieving and degassing at 280° C.). The melt is discharged to a cooling conveyor and broken. The polyamide 12 precondensate has a number average molar mass of 4070 g/mole. 450 g of this PA 12 precondensate are molten and freed from residual water by applying a vacuum (<10 mbar, 1 h). Then, 300 g of melt of the polybutylene terephthalate precondensate from Example 1, 50 g of polycaprolactonediol having $M_n$=1000 g/mole and 0.7 g of butyl stannic acid are added. The reactor is closed directly afterwards and the pressure is reduced (<2 mbar). After 2 h, the esterification is terminated by discontinuing the vacuum and the block polymer is discharged.

Example 8

36.0 kg of laurinlactam are polymerized by adding 2.17 kg of terephthalic acid (pressure phase: 300° C. and 20 bar, stress relieving and degassing at 280° C.). The melt is discharged to a cooling conveyor and broken. The polyamide 12 precondensate has a number average molar mass of 3000 g/mole.

400 g of this PA 12 precondensate are molten and freed from residual water by applying a vacuum (<10 mbar, 1 h). Then, 300 g of melt of the polybutylene terephthalate precondensate from Example 1, 50 g of polytetrahydrofuran having $M_n$=2000 g/mole and 0.7 g of butyl stannic acid are added. The reactor is closed directly afterwards and the pressure is reduced (<2 mbar). After 2 h, the esterification is terminated by discontinuing the vacuum, and the block polymer is discharged.

Example 9

18.0 kg of 12-aminolauric acid and 2.64 kg of dodecanedicarboxylic acid are condensed at temperatures up to 240° C. to give a PA 12 precondensate. Then, 1.06 kg of dimer diol and 46 g of an esterification catalyst are added, and a vacuum (final pressure <10 mbar) is applied for 1 hour. After discontinuing the vacuum using nitrogen, 26.78 kg of the polybutylene terephthalate precondensate from Example 2 are introduced into the polyester amide melt with agitation. A vacuum is applied again directly afterwards. The oil temperature is raised to 260° C. After 90 min., calculated from the beginning of the 2nd vacuum phase, the desired torsional moment is achieved, and the block polymer is discharged.

TABLE 1

Composition and analysis results of the polyester amides: Examples 3 to 9

| Bei-spiel | PBT-VK type | conc.[5] | 2nd diol comp. type | conc.[4] | $\eta_{rel}$[3] | $T_{m1}$ [° C.] | $T_{m2}$ [° C.] | mod. of elas. in tension | RF[1] | RD[2] |
|---|---|---|---|---|---|---|---|---|---|---|
| 3 | Ex. 1 | 39.6 | $C_{36}$-Diol | 2.4 | 1.64 | 169 | 207 | 1030 | 38 | 320 |
| 4 | Ex. 1 | 48.3 | $C_{36}$-Diol | 2.4 | 1.55 | 162 | 209 | 900 | 37 | 360 |
| 5 | Ex. 1 | 58.7 | $C_{36}$-Diol | 2.1 | 1.57 | 145 | 201 | 800 | 33 | 430 |
| 6 | Ex. 2 | 56.8 | $C_{36}$-Diol | 1.6 | 1.61 | 163 | 213 | 1050 | 40 | 410 |
| 7 | Ex. 1 | 37.5 | PCL-Diol[7] | 6.2 | 1.51 | 172 | 200 | 610 | 35 | 360 |
| 8 | Ex. 1 | 40.0 | Poly-THF[8] | 6.7 | 1.58 | 168 | 205 | 650 | 36 | 400 |
| 9 | Ex. 2 | 57.0 | $C_{36}$-Diol | 2.3 | 1.55 | 154 | 211 | 900 | 40 | 320 |

[1]RF = tear resistance [N/mm²]
[2]RJ = elongation at break [N/mm²]
[3]$\eta_{rel}$ = 0.5% m-cresol (DIN 53727)
[4]% by weight
[5]% by weight
[6]PBT-VK/polybutylene terephthalate precondensate
[7]PCL diol: polycaprolactone diol
[8]Poly-THF: polytetrahydrofurane diol (or polytetramethylene glycol)

Example 10

For checking the interlaminar or composite bonding, two-part DIN tension test bars were made on an Arburg Allrounder 350-210-750 and subjected to a tensile test. Inserts were initially made from the block polyester amides, on which the corresponding homopolymers or polymer compounds were sprayed. The processing temperatures were chosen such that partial fusion of the inserts on the common contact surface was possible. Table 2 summarizes the tear resistance determined in the tensile test according to DIN 53455.

TABLE 2

Tear resistance of the two-part tension test bars in N/mm²

|  | Grilamid L25[1] | Grilamid L25W40[2] | Grilpet B24[3] |
|---|---|---|---|
| Example 3 | 32 | 26 | 10 |
| Example 4 | 28 | 26 | 11 |
| Example 5 | 30 | 24 | 16 |
| Example 6 | 32 | 26 | 20 |

[1] = highly viscous PA 12
[2] = plasticizer-containing flexible PA 12
[3] = polybutylene terephthalate Example 11

8×1–3 laminated tubes having the following structure were produced by coextrusion: inner layer: 0.45 mm of impactproof-modified PBT, middle layer: 0.10 mm of adhesion agent example 5, outer layer: 0.45 mm of flexible polyamide 12. The adhesion is assessed by means of a spiral cut. No peelings can be observed even in the adhesive test by means of a blade. The adhesion to both layers is thus very good. The good composite bonding is maintained even after 1000 hours of storage in fuel for testing at 60° C.

Example 12 a) Grilamid L25 and Grilpet B24 are extruded in a ratio of 2:3 without addition.
b) 2 parts of Grilamid L25 and 3 parts of Grilpet B24 are extruded with 20% of a block polyester amide.
c) 2 parts of Grilamid L25 and 3 parts of Grilpet B24 are extruded with 10% of a block polyester amide.
d) 2 parts of Grilamid L25 and 3 parts of Grilpet B24 are extruded with 5% of a block polyester amide.

While in the extrusion under a) a strongly pulsating strand which cannot be granulated results, a homogeneous, non-pulsating strand which has a smooth surface and can be granulated without problems forms in extrusions b) to d).

Comparative Example

A mixture of 2.76 kg of terephthalic acid, 4.05 kg of 12-aminolauric acid, 0.34 kg of dodecanedicarboxylic acid, and 2.25 kg of butanediol are slowly heated to 200° C. in the presence of an esterification catalyst. The condensation reactions start at a temperature of about 180° C., which can be identified by the intense water distillation. When the distillation abates, the temperature is increased to 240° C. and a vacuum (<10 mbar) is applied after the column head temperature has dropped below 70° C. After a vacuum phase of about 2 h, the desired melt viscosity is achieved, so that the product can be discharged and granulated.

The random polyester amide only has a melting point at 112° C., the solution viscosity is 1.60 (0.5% in m-cresol).

As described in Example 9, the composite bonding was checked by means of sandwich injection molding (polyester amide as inlay) and subsequent tensile test.

TABLE 3

Tear resistance of the two-part tension test bars in N/mm²

|  | Grilamid L25 | Grilamid L25W40 | Grilpet B24 |
|---|---|---|---|
| Comp. Ex. | 2 | 4 | 0 |

The result of the tensile test made with the two-part DIN-S3 tension test bar shows an adhesion of the random polyester amide to the selected homopolymers which is markedly poorer than that of the corresponding block polymers. The tension test bar made of random polyester amide and PBT already decays when the injection-molding part is demolded.

The formulation of the random polyester amide corresponds to a block polymer, consisting of a PA 12 segment having a number average molar mass of about 3000 g/mole and a PBT segment having a number average molar mass of about 2250 g/mole. In contrast to the block polymer, the random polyester amide only has a melting point at a low temperature (cf. Example 3). This means that when heated to e.g. 150° C.—sufficient composite bonding of the random polyester amide at room temperature being assumed—, the composite structure would be disintegrated into its components, while the composite structure including the block polyester amide from Example 3 continues to be stable at this elevated temperature as well.

As compared to the correspondingly composed block polyester amide, the random polyester amide is a highly flexible polymer having little strength. Most of the adhesive strengths of the block polyester amides, listed in Table 2, exceed the tear resistance of the pure random polyester amide.

TABLE 4

Composition and analysis results of the random polyester amide

| Example | PBT-VK type | PBT-VK conc. | 2nd diol comp. type | 2nd diol comp. conc. | $\eta_{rel}$ | $T_{m1}$ | $T_{m2}$ | mod. of elas. in tension | RF | RD |
|---|---|---|---|---|---|---|---|---|---|---|
| Comp. Ex. | — | — | — | — | 1.60 | 112 | — | 190 | 15 | 260 |

Abbreviations see legend of Table 1.

What I claim is:

1. Adhesion agents and compatibility agents, respectively, on the basis of partially crystalline, high-molecular block (co)polyester amides, produced by direct esterification of carboxyl-terminated polyamide precondensates and hydroxyl-terminated or hydroxycarboxyl-terminated polyester segments, wherein the block (co)polyester amides form two crystalline phases and comprise:
   (A) at least one polyamide block having a uniform number average molar mass of at least 1000 g/mole, wherein the polyamide block is based on lactam-containing polyamides,
   (B) at least one polyester block selected from the group consisting of aromatic polyesters and copolyesters and having a uniform number average molar mass of at least 1000 g/mole, and
   (C) at least one further diol component of the general structure

HO—R—OH, wherein R is selected from the group consisting of aliphatic (co)polyesters, partially aromatic (co)polyesters, aliphatic polyethers, aliphatic (co)polyester amides, polycarbonates, aliphatic hydrocarbons, and aromatic hydrocarbons, wherein the diol component has an average molar mass of at least 500 g/mole.

2. The adhesion agents according to claim 1 wherein the at least one polyamide block (A) is synthesized from monomers consisting of lactam, α,ω-aminocarboxylic acids having 6 or 12 C atoms and dicarboxylic acids having 2–44 C atoms.

3. The adhesion agents according to claim 1 or claim 2, wherein the at least one polyamide block (A) is synthesized from monomers consisting of lactam, aliphatic dicarboxylic acids having 2 to 12 C atoms, aromatic dicarboxylic acids having 6 to 14 C atoms, and aliphatic or cycloaliphatic diamines having 2 to 12 C atoms.

4. The adhesion agents according to claim 1 wherein the at least one polyamide block (A) is based on lactam-12.

5. The adhesion agents according to claim 1 wherein the at least one polyester block (B) is synthesized from monomers selected from the group consisting of aromatic dicarboxylic acids and dicarboxylic acid diesters and from the group of diols having 2 to 12 C atoms.

6. The adhesion agents according to claim 1 or 5, wherein the at least one polyester block (B) is based on at least one of polyethylene terephthalate and polybutylene terephthalate.

7. The adhesion agents according to claim 1 wherein the at least one polyamide block (A) is based on PA 12 and the at least one polyester block (B) is based on polybutylene terephthalate.

8. The adhesion agents according to claim 1 wherein the at least one diol component (C) comprises at least one of the group consisting of polyalkylene adipates on the basis of $C_2$–$C_6$ diols, polycaprolactone diols and polyalkylene dimerates.

9. The adhesion agents according to claim 1 wherein the at least one diol component (C) comprises at least one of the group consisting of poly(ethylene glycol), poly(propylene glycol) and polytetrahydrofuran.

10. The adhesion agents according to claim 1 wherein the at least one diol component comprises a dimer diol.

11. A process for the production of the adhesion agent molding compounds according to claim 1 comprising the steps of:
   (A) synthesizing, in a first polymerization or polycondensation step, the at least one polyamide block up to a defined number average molar mass as well as a defined terminal group functionality and concentrations;
   (B) submitting the at least one synthesized polyamide block to a vacuum phase;
   (C) adding the at least one block polyester to the at least one polyamide block as prepolymerized chain units, which have a defined molar mass as well as a defined terminal group functionality and concentration,
   (D) introducing at least a portion of the diol component into the polyamide block-polyester block mixture to yield a (co)polyester amide mixture, and
   (E) fully condensing, in vacuo and in the presence of a catalyst, the copolyester amide mixture to give the high-molecular block (co)polyester amide.

12. A method of using the block (co)polyester amide compounds according to claim 1 for the production of fibers, sheets or films and molded articles.

13. A method of using the block polyester amide compounds according to claim 1 as one of an adhesion agent or a compatibility agent in coextrudates on the basis of polyamide and (co) polyester.

14. A composite polymer hose pipe or tube, optionally corrugated at least in a section thereof, comprising at least one inner layer and at least one outer layer consisting of a polyamide and a (co)polyester, respectively, wherein the inner and outer layers are frictionally bonded to each other by at least one intermediate layer which comprises an adhesion agent molding compound according to claim 1.

15. A thermoplastic multilayer or composite structure comprising:
   (a) at least one layer consisting of a molding compound on the basis of a polyamide,
   (b) at least one layer consisting of a molding compound on the basis of a (co)polyester; and
   (c) at least one intermediate layer consisting of an adhesion agent molding compound according to claim 1.

16. The adhesion agents according to claim 2 wherein said dicarboxylic acids have dicarboxylic acids having 2 to 12 C atoms, 36 C atoms and 44 C atoms.

17. The adhesion agents according to claim 5 wherein the at least one polyester block (B) is synthesized from monomers selected from the group consisting of ethylene glycol, butanediol, hexanediol and cylohexane dimethanol.

18. The adhesion agents according to claim 5 wherein the at least one polyester block (B) is synthesized from monomers selected from the group consisting of terephthalic acid, isophthalic acid, 2,6-naphthalene dicarboxylic acid, and dimethyl esters thereof.

19. The method according to claim 11 wherein the step of adding the polyester block is performed substantially simultaneously as the step of introducing the diol component.

20. The method according to claim 19 wherein the polyester block and the diol component are added to the polyamide block as a melt.

21. The method according to claim 11 wherein the step of adding the polyester block comprises adding the polyester block as a solid substance.

22. The method according to claim 11 wherein the step of introducing at least a portion of the diol comprises introducing less than the entirety of the diol, and wherein the method further includes the step of introducing the remaining amount of the diol after at least partially condensing the (co)polyester amide mixture.

23. The method according to claim 22 further comprising the step of fully condensing the (co)polyester amide mixture and the remainder of the diol to form the (co)polyester amide block.

24. The composite polymer hose pipe or tube according to claim 14 wherein the at least one intermediate layer acts as a barrier between the inner and outer layers.

* * * * *

UNITED STATES PATENT AND TRADEMARK OFFICE
CERTIFICATE OF CORRECTION

PATENT NO. : 5,932,686
DATED : August 3, 1999
INVENTOR(S) : Hoff

Page 1 of 1

It is certified that error appears in the above-identified patent and that said Letters Patent is hereby corrected as shown below:

Title Page delete "A" from the title

<u>Column 1,</u>
Line 1 delete "A" from the title
Line 27 "inter alia" should be in italics
Line 47 "inter alia" should be in italics <u>Column 2,</u>
Line 19 "in situ" should be in italics <u>Column 8,</u>
Line 16 delete "." after "260°C"
Line 64 delete "." after "260°C"

Signed and Sealed this

Twelfth Day of June, 2001

*Attest:*

*Attesting Officer*

NICHOLAS P. GODICI
*Acting Director of the United States Patent and Trademark Office*